United States Patent
Kyo

(10) Patent No.: US 7,400,781 B2
(45) Date of Patent: Jul. 15, 2008

(54) SYMMETRIC TYPE IMAGE FILTER PROCESSING APPARATUS AND PROGRAM AND METHOD THEREFOR

(75) Inventor: Shorin Kyo, Tokyo (JP)

(73) Assignee: NEC Corporation, Tokyo (JP)

( * ) Notice: Subject to any disclaimer, the term of this patent is extended or adjusted under 35 U.S.C. 154(b) by 791 days.

(21) Appl. No.: 10/735,641

(22) Filed: Dec. 16, 2003

(65) Prior Publication Data

US 2004/0126035 A1    Jul. 1, 2004

(30) Foreign Application Priority Data

Dec. 17, 2002    (JP) .............................. 2002-364628

(51) Int. Cl.
- G06K 9/40    (2006.01)
- G06K 9/60    (2006.01)
- G06F 17/10    (2006.01)

(52) U.S. Cl. ...................... 382/276; 382/303; 382/304; 708/308

(58) Field of Classification Search .................. 382/276, 382/304

See application file for complete search history.

(56) References Cited

U.S. PATENT DOCUMENTS

| | | | |
|---|---|---|---|
| 6,973,469 B1 * | 12/2005 | Hsu et al. ................... | 708/402 |
| 2004/0133617 A1 * | 7/2004 | Chen et al. .................. | 708/523 |
| 2004/0267857 A1 * | 12/2004 | Abel et al. ................... | 708/524 |

FOREIGN PATENT DOCUMENTS

JP    2862388 B2    12/1998

OTHER PUBLICATIONS

Rafael C. Gonzalez, Digital Image Processing, Nov. 9, 2001, Prentice Hall, 2/E, p. 117.*
Morris Mano, Computer System Architecture, 1993, Prentice Hall; 3 edition, p. 327-328.*

* cited by examiner

*Primary Examiner*—Jingge Wu
*Assistant Examiner*—Max Shikhman
(74) *Attorney, Agent, or Firm*—Sughrue Mion, PLLC

(57) ABSTRACT

A symmetric type image filter processing apparatus having a symmetric type image filter composed of symmetric kernel coefficients, in which SIMD commands are utilized efficiently for making the filtering processes high speed, is provided. The symmetric type image filter processing apparatus provides a row-wise intermediate data generating section, a row-wise intermediate data utilizing section, and a memory. The row-wise intermediate data generating section multiplies each kernel coefficient of M pieces in each column of {(N+1)/2} columns at the right or left column by each pixel of M pieces in the column direction of image data having P pixels in one row, and cumulatively adds the multiplied results, by using SIMD commands that can process sequential data of Q pieces. This multiplication and addition operation is executed P/Q times, and intermediate data in one row of the image data are generated and stored in an intermediate data storing region in the memory. The row-wise intermediate data utilizing section reads out the intermediate data storing in the intermediate data storing region of the memory. And operation result pixels are calculated by cumulatively adding the intermediate data.

15 Claims, 8 Drawing Sheets

FIG. 3

SYMMETRIC KERNEL COEFFICIENTS

| K(0,0) | K(1,0) | K(2,0) |
|--------|--------|--------|
| K(0,1) | K(1,1) | K(2,1) |
| K(0,2) | K(1,2) | K(2,2) |

IN THIS,
K(2,0)==K(0,0)
K(2,1)==K(0,1)
K(2,2)==K(0,2)

SOURCE IMAGE S

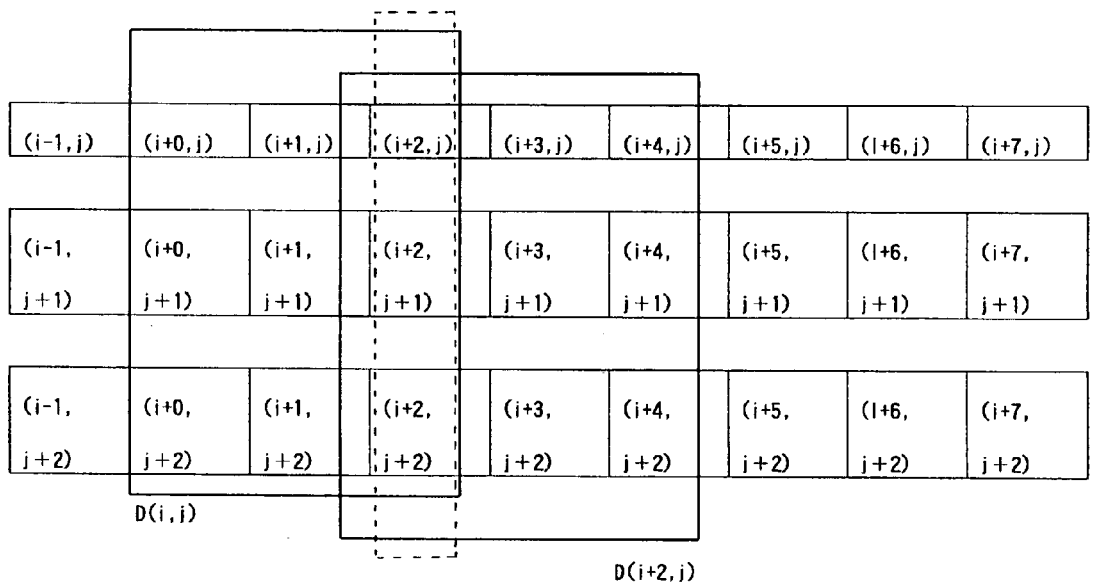

D(i,j), D(i+2,j): TWO OPERATION RESULT PIXELS POSITIONED IN THE SAME ROW

D(i,j) = S(i,j+0)×K(0,0)+S(i+1,j+0)×K(1,0)+<u>S(i+2,j+0)×K(2,0)</u>
    + S(i,j+1)×K(0,1)+S(i+1,j+1)×K(1,1)+<u>S(i+2,j+1)×K(2,1)</u>
    + S(i,j+2)×K(0,2)+S(i+1,j+2)×K(1,2)+<u>S(i+2,j+2)×K(2,2)</u>

COMMON ITEMS

D(i+2,j) = <u>S(i+2,j+0)×K(0,0)</u>+S(i+3,j+0)×K(1,0)+S(i+4,j+0)×K(2,0)
    + <u>S(i+2,j+1)×K(0,1)</u>+S(i+3,j+1)×K(1,1)+S(i+4,j+1)×K(2,1)
    + <u>S(i+2,j+2)×K(0,2)</u>+S(i+3,j+2)×K(1,2)+S(i+4,j+2)×K(2,2)

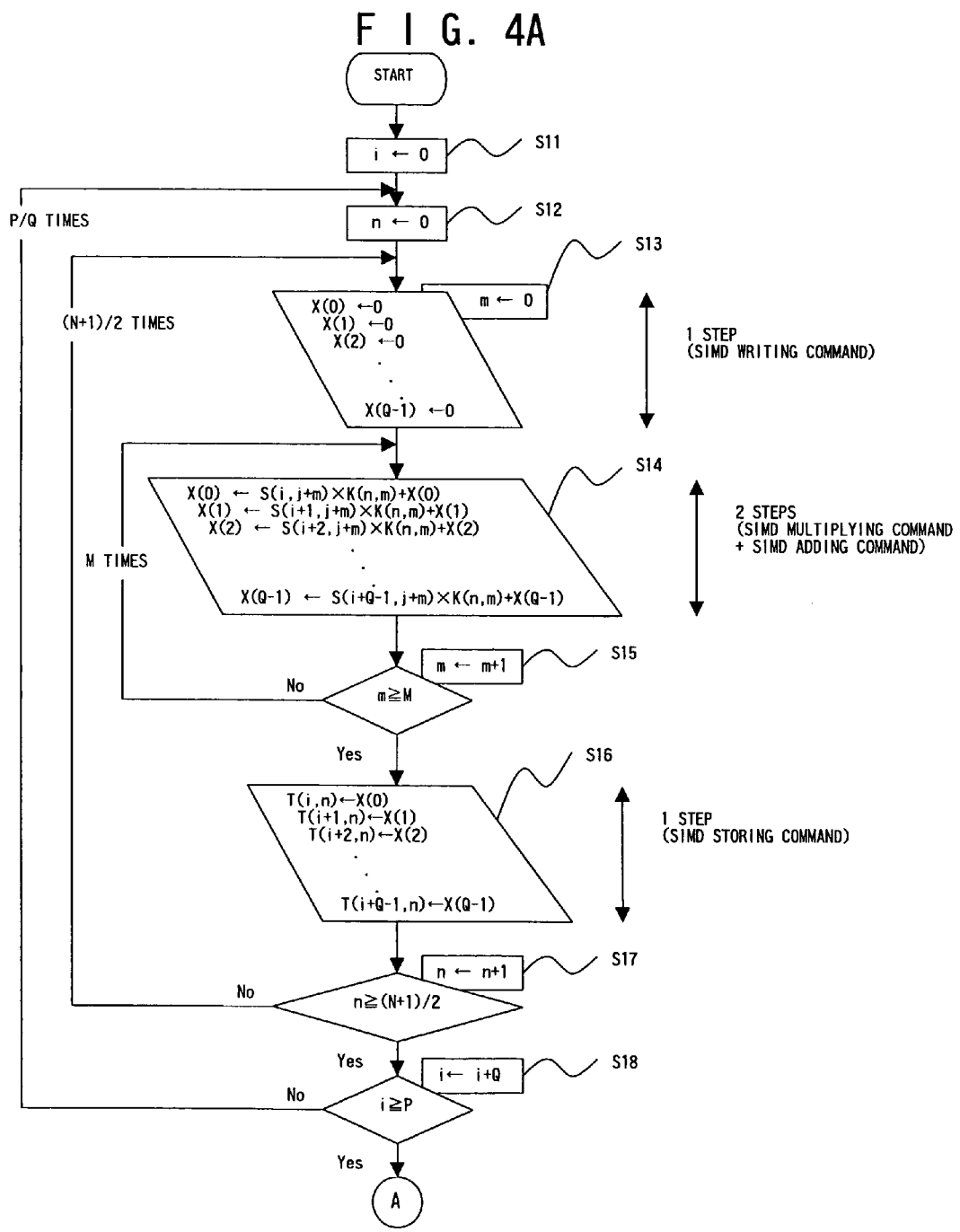

FIG. 5

| n → | 0 | 1 | 2 | 3 | 4 | 5 | 6 | 7 | 8 | 9 | 10 | 11 | 12 |
|---|---|---|---|---|---|---|---|---|---|---|---|---|---|
| m ↓ 0 | 0 | 0 | 0 | 0 | 0 | -1 | -1 | -1 | 0 | 0 | 0 | 0 | 0 |
| 1 | 0 | 0 | 0 | -1 | -1 | -2 | -2 | -2 | -1 | -1 | 0 | 0 | 0 |
| 2 | 0 | 0 | -2 | -2 | -3 | -3 | -4 | -3 | -3 | -2 | -2 | 0 | 0 |
| 3 | 0 | -1 | -2 | -3 | -3 | -3 | -2 | -3 | -3 | -3 | -2 | -1 | 0 |
| 4 | 0 | -1 | -3 | -3 | -2 | +4 | +6 | +4 | -2 | -3 | -3 | -1 | 0 |
| 5 | -1 | -2 | -3 | -3 | +4 | 14 | 19 | 14 | +4 | -3 | -3 | -2 | -1 |
| 6 | -1 | -2 | -4 | -2 | +6 | 19 | 24 | 19 | +6 | -2 | -4 | -2 | -1 |
| 7 | -1 | -2 | -3 | -3 | +4 | 14 | 19 | 14 | +4 | -3 | -3 | -2 | -1 |
| 8 | 0 | -1 | -3 | -3 | -2 | +4 | +6 | +4 | -2 | -3 | -3 | -1 | 0 |
| 9 | 0 | -1 | -2 | -3 | -3 | -3 | -2 | -3 | -3 | -3 | -2 | -1 | 0 |
| 10 | 0 | 0 | -2 | -2 | -3 | -3 | -4 | -3 | -3 | -2 | -2 | 0 | 0 |
| 11 | 0 | 0 | 0 | -1 | -1 | -2 | -2 | -2 | -1 | -1 | 0 | 0 | 0 |
| 12 | 0 | 0 | 0 | 0 | 0 | -1 | -1 | -1 | 0 | 0 | 0 | 0 | 0 |

FIG. 6

| i → | | | | | | | | | | | | | |
|---|---|---|---|---|---|---|---|---|---|---|---|---|---|
| j | 1 | 2 | 3 | 4 | 5 | 6 | 7 | 8 | 9 | 0 | 1 | 2 | · · · |
| ↓ | 11 | 12 | 13 | 14 | 15 | 16 | 17 | 18 | 19 | 10 | 11 | 12 | · · · |
| | 21 | 22 | 23 | 24 | 25 | 26 | 27 | 28 | 29 | 20 | 21 | 22 | · · · |
| | 31 | 32 | 33 | 34 | 35 | 36 | 37 | 38 | 39 | 30 | 31 | 32 | · · · |
| | 41 | 42 | 43 | 44 | 45 | 46 | 47 | 48 | 49 | 40 | 41 | 42 | · · · |
| | 51 | 52 | 53 | 54 | 55 | 56 | 57 | 58 | 59 | 50 | 51 | 52 | · · · |
| | 61 | 62 | 63 | 64 | 65 | 66 | 67 | 68 | 69 | 60 | 61 | 62 | · · · |
| | 71 | 72 | 73 | 74 | 75 | 76 | 77 | 78 | 79 | 70 | 71 | 72 | · · · |
| | 81 | 82 | 83 | 84 | 85 | 86 | 87 | 88 | 89 | 80 | 81 | 82 | · · · |
| | 91 | 92 | 93 | 94 | 95 | 96 | 97 | 98 | 99 | 90 | 91 | 92 | · · · |
| | 101 | 102 | 103 | 104 | 105 | 106 | 107 | 108 | 109 | 100 | 101 | 102 | · · · |
| | 111 | 112 | 113 | 114 | 115 | 116 | 117 | 118 | 119 | 110 | 111 | 112 | · · · |
| | 121 | 122 | 123 | 124 | 125 | 126 | 127 | 128 | 129 | 120 | 121 | 122 | · · · |
| | 131 | 132 | 133 | 134 | 135 | 136 | 137 | 138 | 139 | 130 | 131 | 132 | · · · |
| | 141 | 142 | 143 | 144 | 145 | 146 | 147 | 148 | 149 | 140 | 141 | 142 | · · · |
| | 151 | 152 | 153 | 154 | 155 | 156 | 157 | 158 | 159 | 150 | 151 | 152 | · · · |

FIG. 7

| THE NUMBER OF N AND M | REDUCED RATE OF OPERATION STEPS (%) |
|---|---|
| 3 | 16.67 |
| 5 | 30.00 |
| 7 | 35.71 |
| 9 | 38.89 |
| 11 | 40.91 |
| 13 | 42.31 |
| 15 | 43.33 |
| 17 | 44.12 |
| 19 | 44.74 |
| 21 | 45.24 |
| 23 | 45.65 |
| 999 | 49.90 |

ND METHOD THEREFOR

SYMMETRIC TYPE IMAGE FILTER PROCESSING APPARATUS AND PROGRAM AND METHOD THEREFOR

BACKGROUND OF THE INVENTION

The present invention relates to a symmetric type image filter processing apparatus and a program and a method for filtering processes for image data in the apparatus, at a computer that provides a command set called single instruction stream, multiple data stream (SIMD) commands for making multi media processes high speed.

DESCRIPTION OF THE RELATED ART

At an existing general processor or an existing digital signal processor (DSP), filtering processes for image data are executed by using SIMD commands in which plural data are processed simultaneously by one command. For example, when it is assumed that the kernel size of an image filter is N×M and the number of pixels in the row direction of image data is P, generally, in order to obtain operation result pixels (P pieces) of one row of the image data, the operation of P×2×N×M steps is required. That is, P times of the multiplication and addition operation by the N×M times multiplication and the M×N times addition are required.

FIG. 1 is a flowchart showing processes for obtaining operation result pixels at a conventional symmetric type image filter. As shown in FIG. 1, by using the SIMD commands that can simultaneously process sequential data of Q pieces at one time, source pixels S of M pixels in the column direction and kernel coefficients corresponding to the source pixels S of M pixels are multiplied, and these multiplied results are added cumulatively. This process is repeated N times by moving one pixel in the row direction from the reading start position of the pixel in the column direction. As the result of the operation, the operation result pixels of one row are obtained. In this, Q>1 and P>Q. And in FIG. 1, the processes by using the SIMD commands are shown in the parallelograms. As mentioned above, the operation processes of only (2×N×M)×P/Q steps are enough to obtain the operation result pixels of one row by using the SIMD commands. That is, when the SIMD commands are used, Q times high speed operation can be realized for obtaining the operation result pixels, compared with a case that the SIMD commands are not used.

As a technology for processing image data by using asymmetric type image filter, for example, Japanese Patent No. 2862388 teaches filtering processes in a super high speed image processing system. In this patent, processing elements, whose number is the same number of pixels in one row or a few pieces being less than the number of the pixels in one row, are arranged, and a parallel process is applied every pixel. And the number of operation times and the number of transferring times at the filtering processes are decreased, with this, the high speed processing is realized.

However, in this technology using the symmetric type image filter, it is not described a method how to utilize the SIMD commands efficiently.

In many cases, the kernel coefficients of the image filter have symmetry. Therefore, the multiplication and addition operation results calculated at the time obtaining operation result pixels at the left side can be used for obtaining operation result pixels at the right side.

However, at the conventional technology, the multiplication and addition results calculated at the time obtaining the operation result pixels at the left side are not used for obtaining the operation result pixels at the right side. And the operation result pixels at the right side are calculated by operating the multiplication and addition again. Consequently, there is a problem that a further high speed processing by utilizing the symmetry of the kernel coefficients cannot be realized.

SUMMARY OF THE INVENTION

It is therefore an object of the present invention to provide a symmetric type image filter processing apparatus and a program and a method for filtering processes for image data at the symmetric type image filter processing apparatus, in which SIMD commands are utilized efficiently for making the filtering processes high speed at a symmetric type image filter composed of symmetric kernel coefficients.

According to a first aspect of the present invention, for achieving the object mentioned above, there is provided a symmetric type image filter processing apparatus, which processes image data by a symmetric type image filter composed of N×M kernel coefficients (N and M are odd numbers being 3 or more integers). The symmetric type image filter processing apparatus provides an operating means that multiplies kernel coefficients of the right side column or the left side column for the center column by column elements of image data corresponding to the right side column or the left side column and cumulatively adds the multiplied results, a memorizing means that memorizes operation results being multiplied and cumulatively added results operated at the operating means as intermediate data, and a pixel value calculating means that calculates pixel values of the image data by cumulatively adding the intermediate data memorizing in the memorizing means.

According to a second aspect of the present invention, in the first aspect, the operating means multiplies the kernel coefficients of the right side column or the left side column by the column elements of the image data corresponding to the right side column or the left side column and cumulatively adds the multiplied results, and calculates intermediate data in one row of the image data, and the pixel value calculating means reads out the intermediate data corresponding to the position of each pixel of the image data, and calculates the pixel value by cumulatively adding the read out intermediate data.

According to a third aspect of the present invention, in the first or second aspect, the operating means and the pixel value calculating means execute the operation of the multiplication and the cumulative addition by using SIMD commands.

According to a fourth aspect of the present invention, in the first aspect, the number of pixels in one row of the image data is P (P is a positive integer), and the operating means multiplies each kernel coefficient of M pieces in each column of {(N+1)/2} columns at the right or left side by each pixel of M pieces in the column direction of the image data and cumulatively adds the multiplied results, by using SIMD commands that are capable of processing data of sequential Q pieces simultaneously (Q>1 and Q is a positive integer satisfying the condition P>Q), and executes this multiplying and cumulatively adding operation P/Q times, and generates the intermediate data in one row of the image data.

According to a fifth aspect of the present invention, there is provided a program for making a computer work to execute filter processing to image data by using a symmetric type image filter composed of N×M kernel coefficients (N and M are odd numbers being 3 or more integers). The program for making a computer work to execute filter processing to image data provides an operating step that multiplies kernel coefficients of the right side column or the left side column for the center column by column elements of image data corresponding to the right side column or the left side column and cumulatively adds the multiplied results, a memorizing step that memorizes operation results being multiplied and cumulatively added results operated at the operating step as intermediate data, and a pixel value calculating step that calculates pixel values of the image data by cumulatively adding the intermediate data memorized at the memorizing step.

According to a sixth aspect of the present invention, in the fifth aspect, the operating step multiplies the kernel coefficients of the right side column or the left side column by the column elements of the image data corresponding to the right side column or the left side column and cumulatively adds the multiplied results, and calculates intermediate data in one row of the image data, and the pixel value calculating step reads out the intermediate data corresponding to the position of each pixel of the image data, and calculates the pixel value by cumulatively adding the read out intermediate data.

According to a seventh aspect of the present invention, in the fifth or sixth aspect, the operating step and the pixel value calculating step execute the operation of the multiplication and the cumulative addition by using SIMD commands.

According to an eighth aspect of the present invention, in the fifth aspect, the number of pixels in one row of the image data is P (P is a positive integer), and the operating step multiplies each kernel coefficient of M pieces in each column of $\{N+1\}/2$ columns at the right or left side by each pixel of M pieces in the column direction of the image data and cumulatively adds the multiplied results, by using SIMD commands that are capable of processing data of sequential Q pieces simultaneously (Q>1 and Q is a positive integer satisfying the condition P>Q), and executes this multiplying and cumulatively adding operation P/Q times, and generates the intermediate data in one row of the image data.

According to a ninth aspect of the present invention, there is provided a method for processing image data by a symmetric type image filter composed of N×M kernel coefficients (N and M are odd numbers being 3 or more integers). The method for processing image data provides the steps of, multiplying kernel coefficients of the right side column or the left side column for the center column by column elements of image data corresponding to the right side column or the left side column and cumulatively adding the multiplied results as intermediate data, memorizing operation results being multiplied and cumulatively added results, and calculating pixel values of the image data by cumulatively adding the intermediate data being memorized.

According to a tenth aspect of the present invention, in the ninth aspect, the intermediate data in one row of the image data are calculated by multiplying the kernel coefficients of the right side column or the left side column by the column elements of the image data corresponding to the right side column or the left side column and cumulatively adding the multiplied results, and the pixel values are calculated by reading out the intermediate data corresponding to the position of each pixel of the image data, and by cumulatively adding the read out intermediate data.

According to an eleventh aspect of the present invention, in the ninth or tenth aspect, the multiplying operation and the cumulatively adding operation and the pixel value calculating operation are executed by using SIMD commands.

According to a twelfth aspect of the present invention, in the ninth aspect, the number of pixels in one row of the image data is P (P is a positive integer), and the intermediate data in one row of the image data are generated by P/Q times of the multiplying and cumulatively adding operation that multiplies each kernel coefficient of M pieces in each column of $\{N+1\}/2$ columns at the right or left side by each pixel of M pieces in the column direction of the image data and cumulatively adds the multiplied results, by using SIMD commands that are capable of processing data of sequential Q pieces simultaneously (Q>1 and Q is a positive integer satisfying the condition P>Q).

BRIEF DESCRIPTION OF THE DRAWINGS

The objects and features of the present invention will become more apparent from the consideration of the following detailed description taken in conjunction with the accompanying drawings in which:

FIG. 3 is a diagram showing an example of utilizing intermediate data at the embodiment of the present invention;

FIG. 4A is a flowchart showing processes at a row-wise intermediate data generating section shown in FIG. 2;

FIG. 5 is a diagram showing a symmetric type image filter composed of symmetric kernel coefficients at the embodiment of the present invention;

FIG. 6 is a diagram showing a source image using at an actual example at the embodiment of the present invention; and FIG. 7 is a diagram showing the reduced rate of SIMD command steps at the symmetric type image filter processing apparatus at the embodiment of the present invention.

DESCRIPTION OF THE PREFERRED EMBODIMENT

Figure 1:
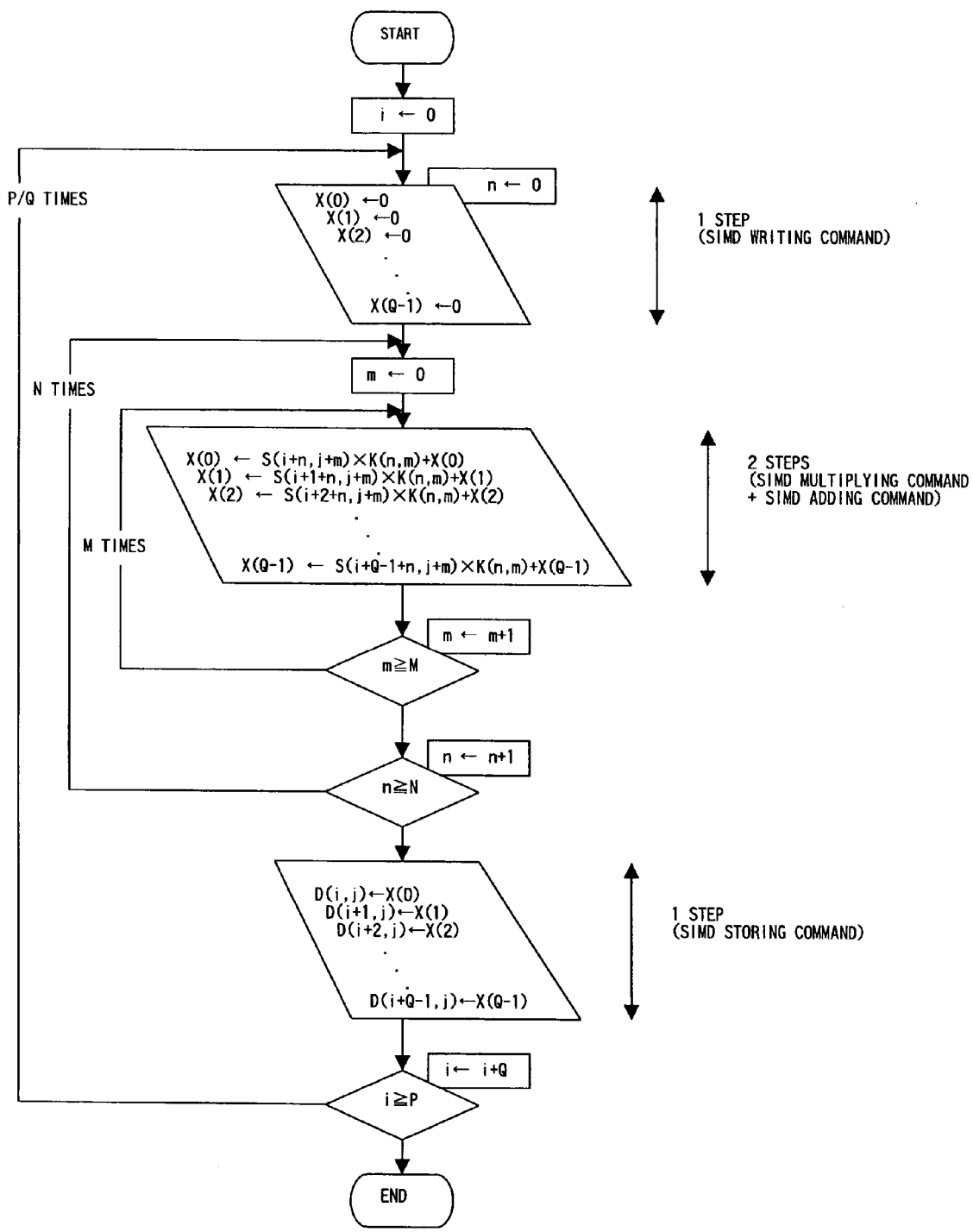
FIG. 1 is a flowchart showing processes for obtaining operation result pixels at a conventional symmetric type image filter.

Referring now to the drawings, an embodiment of the present invention is explained in detail.

Figure 2:
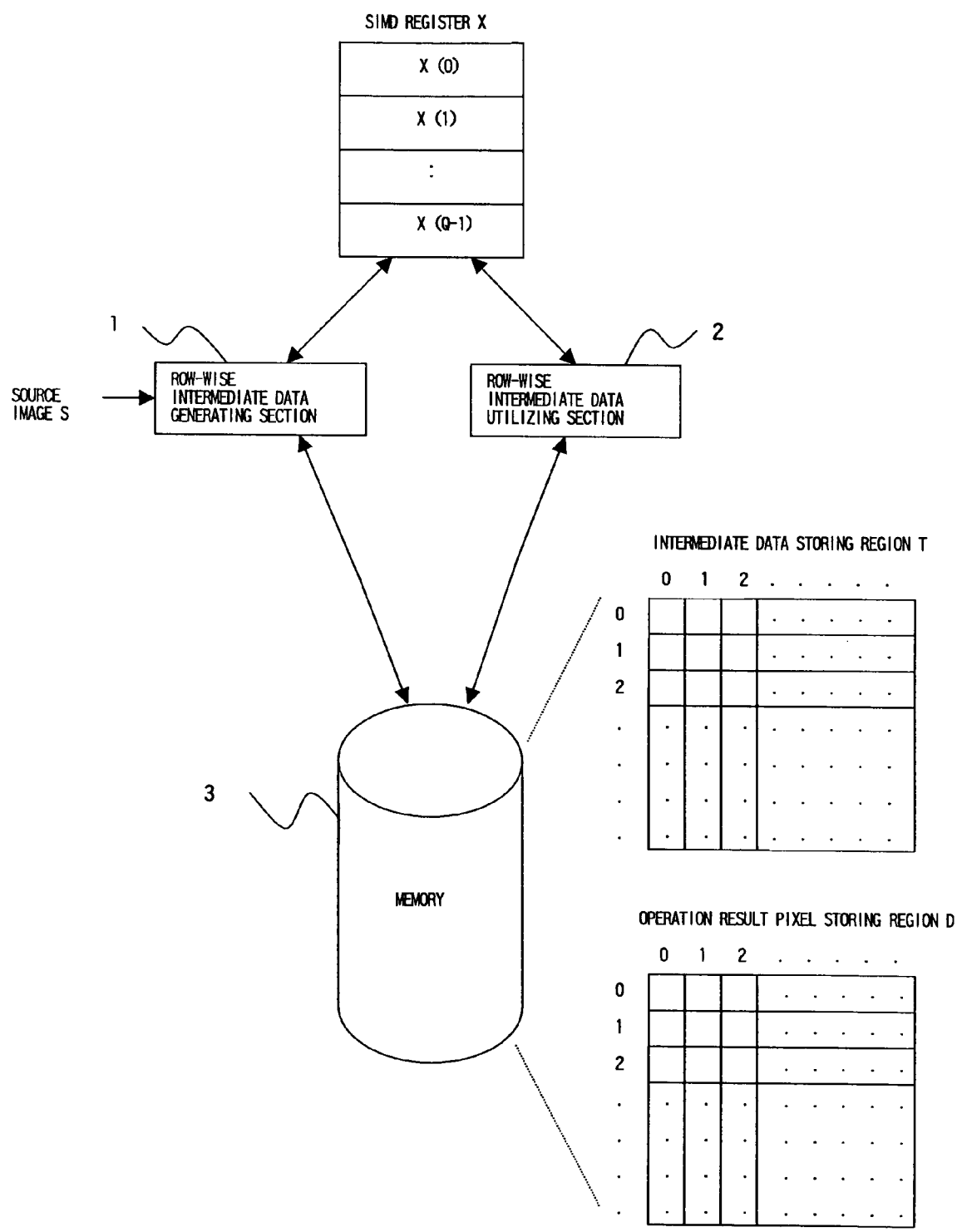
FIG. 2 is a block diagram showing a structure of a symmetric type image filter processing apparatus at an embodiment of the present invention.

FIG. 2 is a block diagram showing a structure of a symmetric type image filter processing apparatus at the embodiment of the present invention. Referring to FIG. 2, a method, in which intermediate data are reused at the symmetric type image filter processing apparatus, is explained.

As shown in FIG. 2, the symmetric type image filter processing apparatus at the embodiment of the present invention provides a row-wise intermediate data generating section 1, a row-wise intermediate data utilizing section 2, and a memory 3. And the row-wise intermediate data generating section 1 and the row-wise intermediate data utilizing section 2 are connected to a SIMD register X. The row-wise intermediate data generating section 1 generates intermediate data (cumulative multiplication and addition intermediate results) which are used at the time when operation result pixels (pixel values of the operation result pixels) of a source image S are obtained. The row-wise intermediate data utilizing section 2 obtains operation result pixels of one row in the symmetric type image filter processing apparatus by utilizing the intermediate data generated at the row-wise intermediate data generating section 1. The memory 3 memorizes the intermediate data and the operation result pixels in the symmetric type image filter processing apparatus.

In this, it is defined that the number of pixels in one row of a source image is P, and it is also defined that a SIMD command can simultaneously process sequential data of Q pieces at one time. In this, Q>1 and Q is a positive integer satisfying the condition P>Q. The SIMD register X (register for SIMD commands), which is used at the time when the SIMD commands are executed, can store data elements of Q pieces at the same time.

The technology for simultaneously processing plural data by using the SIMD commands is an existing technology, therefore, the detailed explanation is omitted.

A case, in which operation result pixels are obtained by using a symmetric type image filter processing apparatus having symmetric kernel coefficients whose kernel size is N×M, is studied. In this case, first, the multiplication and addition operation results (intermediate data), between M pixels in the column direction of subject image data to which the filtering is applied and the kernel coefficients corresponding to these M pixels, are obtained. And these multiplication and addition operation results (intermediate data) can be used at the time when other operation result pixels at the position moved from the subject image data by (N+1)/2 pixels are obtained.

FIG. 3 is a diagram showing an example of utilizing the intermediate data at the embodiment of the present invention. As shown in FIG. 3, when the operation result pixels D (i,j) D(i+2,j) are obtained from the subject image data by using the symmetric type image filter processing apparatus having the symmetric kernel coefficients of the N×M kernel size, the following multiplication and addition operation is executed. In this, N and M are odd numbers and positive integers being 3 or more.

$$D(i, j) = S(i, j+0) \times K(0, 0)$$
$$+ S(i+1, j+0) \times K(1, 0)$$
$$+ S(i+2, j+0) \times K(2, 0)$$
$$+ S(i, j+1) \times K(0, 1)$$
$$+ S(i+1, j+1) \times K(1, 1)$$
$$+ S(i+2, j+1) \times K(2, 1)$$
$$+ S(i, j+2) \times K(0, 2)$$
$$+ S(i+1, j+2) \times K(1, 2)$$
$$+ S(i+2, j+2) \times K(2, 2) \text{ and}$$
$$D(i+2, j) = S(i+2, j+0) \times K(0, 0)$$
$$+ S(i+3, j+0) \times K(1, 0)$$
$$+ S(i+4, j+0) \times K(2, 0)$$
$$+ S(i+2, j+1) \times K(0, 1)$$
$$+ S(i+3, j+1) \times K(1, 1)$$
$$+ S(i+4, j+1) \times K(2, 1)$$
$$+ S(i+2, j+2) \times K(0, 2)$$
$$+ S(i+3, j+2) \times K(1, 2)$$
$$+ S(i+4, j+2) \times K(2, 2)$$

In these obtained operation result pixels, common items exist. The common items are as follows:

$$S(i+2,j+0) \times K(2,0) = S(i+2,j+0) \times K(0,0)$$

$$S(i+2,j+1) \times K(2,1) = S(i+2,j+1) \times K(0,1)$$

$$S(i+2,j+2) \times K(2,2) = S(i+2,j+2) \times K(0,2)$$

In this, K(2,0)==K(0,0), K(2,1)==K(0,1), and K(2,2)=K(0,2).

At the embodiment of the present invention, when one of the operation result pixels was obtained, this operation result of one row is made as the intermediate data, and the other of the operation result pixels is obtained by utilizing the common items in the obtained intermediate data.

Next, referring to FIG. 2, each section in the symmetric type image filter processing apparatus at the embodiment of the present invention is explained in more detail.

The row-wise intermediate data generating section 1 generates cumulative multiplication and addition results, which are the added results of the multiplication of source pixels of one row by the kernel coefficients by using the SIMD commands, as the intermediate data. And the row-wise intermediate data generating section 1 stores these intermediate data in an intermediate data storing region T of the memory 3.

The row-wise intermediate data utilizing section 2 obtains operation result pixels of one row in the symmetric type image filter processing apparatus by reading out the intermediate data of N pieces storing in the intermediate data storing region T of the memory 3, and further by cumulatively adding the intermediate data by using the SIMD command. As the filtering processes for the whole image, the processes for one row are repeated by the times of the number of the rows.

The memory 3 provides the intermediate data storing region T, to which the intermediate data generated at the row-wise intermediate data generating section 1 are stored, and an operation result pixel storing region D, to which operation result pixels obtained at the row-wise intermediate data utilizing section 2 are stored.

Figure 4B:
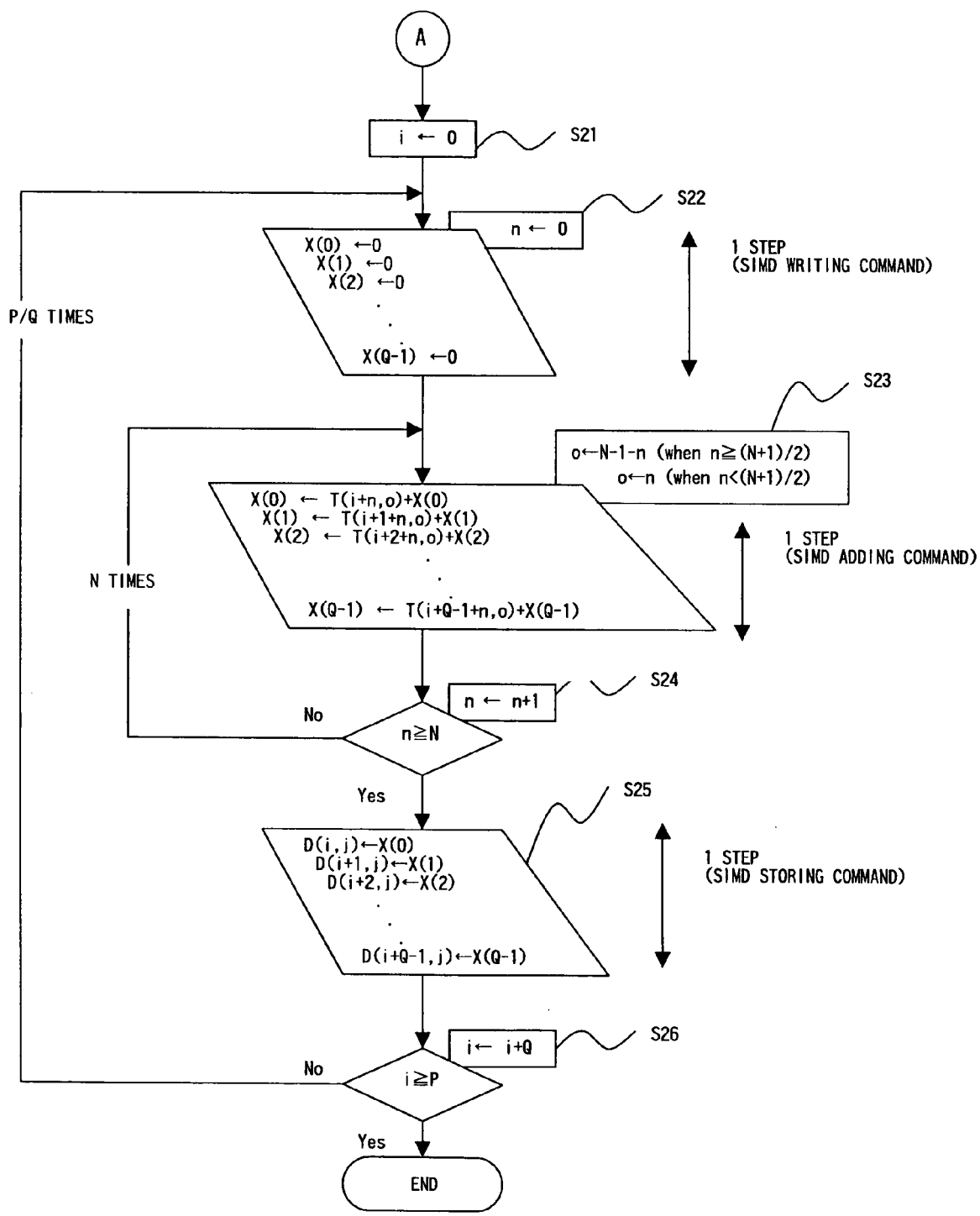
FIG. 4B is a flowchart showing processes at a row-wise intermediate data utilizing section shown in FIG. 2.

Next, referring to drawings, the processes at each section in the symmetric type image filter processing apparatus at the embodiment of the present invention is explained. FIG. 4A is a flowchart showing processes at the row-wise intermediate data generating section 1 shown in FIG. 2. And FIG. 4B is a flowchart showing processes at the row-wise intermediate data utilizing section 2 shown in FIG. 2. Referring to FIGS. 4A and 4B, the processes are explained.

At the explanation mentioning below, when the operation result pixels are obtained from the source image S, the following variables are defined. The variable showing the row number in the source image S being processed at present is defined as "j" and the variable showing the column number in the row number "j" of the source image S in which the intermediate data are being obtained is defined as "i". Further, the variable showing the column number in the kernel coefficients of M×N pieces, which is used for the processing, is defined as "n", and the variable showing the row number in the kernel coefficients of M×N pieces, which is used for the processing in the "n" column, is defined as "m".

First, referring to FIG. 4A, the processes at the row-wise intermediate data generating section 1 is explained.

The row-wise intermediate data generating section 1 initializes the variables "i", "n" and "m" to "0", and also initializes all elements in the SIMD register X to "0" (steps S11 to S13).

Next, the row-wise intermediate data generating section 1 multiplies the source pixels S (i,j+m) to S (i+Q−1, j+m) of sequential Q pieces from the "i" th column to the "i+Q−1" th column of (j+m) row by the kernel coefficients K (n, m) simultaneously, by using once the SIMD multiplying command and the SIMD adding command. And the row-wise intermediate data generating section 1 simultaneously stores the results of sequential Q pieces, obtained from this operation, in the sequential element positions in the SIMD register X (step S14).

After this, the row-wise intermediate data generating section 1 makes the variable "m" increase by one, and compares the increased "m" with the M. When the increased "m" is less than the M (No at step S15), the process of the step S14 is repeated. And when the increased "m" became the M (Yes at the step S15), the process goes to the next step. That is, the row-wise intermediate data generating section 1 multiplies the source pixels S of the Q columns, storing in the SIMD register X, by the kernel coefficients of the same columns respectively, and cumulatively adds the multiplied results.

And the row-wise intermediate data generating section 1 stores the results obtained at the steps S14 and S15 (the intermediate data of the sequential Q pieces) in the sequential positions (i,n) to (i+Q−1,n) in the intermediate data storing region T of the memory 3, by once using the SIMD storing command (step S16).

By the operation mentioned above, the multiplied and added results of the "i" th column of the source pixels S and the "n" th column of the kernel coefficients are stored in the intermediate data storing region T of the memory 3.

After this, the row-wise intermediate data generating section 1 makes the variable "n" increase by one, and when the increased "n" is less than the (N+1)/2 (No at step S17), the process returns to the step S13. And when the "n" became the (N+1)/2 (Yes at the step S17), the process goes to the next step. The row-wise intermediate data generating section 1 makes the "i" increase by the Q, and when the increased "i" is less than the P (No at step S18), the process returns to the step S12. And when the increased "i" became the P (Yes at the step S18), the intermediate data generating processes ends (step S18).

As mentioned above, the row-wise intermediate data generating section 1 executes the multiplication and addition operation of P/Q times, and generates the intermediate data of {P×(N+1)/2} pieces. In this, when the P/Q is indivisible, the remainder is discarded, and the operation of P/Q+1 times is executed.

Next, referring to FIG. 4B, the processes at the row-wise intermediate data utilizing section 2 is explained.

The row-wise intermediate data utilizing section 2 initializes the variables "i" and "n" to "0", and also initializes all elements in the SIMD register X to "0" (steps S21 and S22).

The row-wise intermediate data utilizing section 2 compares the value of the "n" with the value of the (N+1)/2, for deciding the intermediate data to be referred at the time when operation result pixels are obtained. When the value of the "n" is the value of the (N+1)/2 or more, the value of (N−1−n) is made the variable "o", and when the value of the "n" is less than the value of the (N+1)/2, the value of "n" is made the variable "o". By the processes mentioned above, the intermediate data of sequential Q pieces storing in the intermediate data storing region T {(i+n, o) to (i+Q−1+n, o)} of the memory 3 are decided as the intermediate data to be referred. And the row-wise intermediate data utilizing section 2 stores the decided intermediate data in the sequential element positions in the SIMD register X, by once using the SIMD adding command (step S23).

After this, the row-wise intermediate data utilizing section 2 makes the variable "n" increase by one, and compares the increased "n" with the N. When the increased "n" is less than the N (No at step S24), the process returns to the step S23, and the step S23 is repeated. That is, the row-wise intermediate data utilizing section 2 repeats the process at the step 23 N times. And when the increased "n" became the N (Yes at the step 24), the process goes to the next step.

And the row-wise intermediate data utilizing section 2 stores the operation result pixels obtained at the steps S23 and S24 in the sequential positions (i,j) to (i+Q−1,j) in the operation result pixel storing region D of the memory 3, by once using the SIMD storing command (step S25).

After this, the row-wise intermediate data utilizing section 2 makes the "i" increase by the Q, and compares the increased "i" with the P. When the increased "i" is less than the P (No at step S26), the process returns to the step S22. And when the increased "i" became the P, the processes obtaining the operation result pixels end.

As mentioned above, the filtering processes for the source image S are executed, that is, the operation result pixels are obtained.

Next, the filtering processes for the source image S are explained by using an actual example. FIG. 5 is a diagram showing a symmetric type image filter composed of symmetric kernel coefficients at the embodiment of the present invention. In FIG. 5, as an example, a Mexican hat shaped symmetric type image filter in which the kernel size is 13×13 (N=M=13) is shown. FIG. 6 is a diagram showing a source image using at the actual example at the embodiment of the present invention. At the actual example, in FIG. 6, the source pixels at the column number "i" is from "0" to "3" and the row numbers "j" is from "0" to "12" are used.

At the explanation mentioning below, P=256 (the number of pixels in the row direction) and Q=4 (the sequential number of pixels that can be simultaneously processed by the SIMD command) are set. And in order to focus on the first row of the source image, j=0 is set.

First, the row-wise intermediate data generating section 1 executes the processes mentioned at the steps S11 to S13. That is, the row-wise intermediate data generating section 1 initializes the variables "i", "n" and "m" to "0", and also initializes all elements in the SIMD register X to "0".

And the row-wise intermediate data generating section 1 repeats the processes mentioned at the steps S14 and S15. That is, the variables "i" and "n" are fixed to "0" (i=0 and n=0), and the value of the variable "m" is increased by one each until the variable "m" becomes 12, and the cumulative multiplication and addition operation for the kernel coefficients and the source pixels is executed. And this operation results are stored in the SIMD register X (0) to X (3). That is, the row-wise intermediate data generating section 1 executes the following operation and obtains the intermediate data of Q pieces (four pieces).

$$X(0) = 1 \times 0 + 11 \times 0 + 21 \times 0 + 31 \times 0 + 41 \times 0 +$$
$$51 \times (-1) + 61 \times (-1) + 71 \times (-1) +$$
$$81 \times 0 + 91 \times 0 + 101 \times 0 + 111 \times 0 + 121 \times 0$$
$$X(1) = 2 \times 0 + 12 \times 0 + 22 \times 0 + 32 \times 0 + 42 \times 0 +$$
$$52 \times (-1) + 62 \times (-1) + 72 \times (-1) +$$
$$82 \times 0 + 92 \times 0 + 102 \times 0 + 112 \times 0 + 122 \times 0$$
$$X(2) = 3 \times 0 + 13 \times 0 + 23 \times 0 + 33 \times 0 + 43 \times 0 +$$
$$53 \times (-1) + 63 \times (-1) + 73 \times (-1) +$$
$$83 \times 0 + 93 \times 0 + 103 \times 0 + 113 \times 0 + 123 \times 0$$
$$X(3) = 4 \times 0 + 14 \times 0 + 24 \times 0 + 34 \times 0 + 44 \times 0 +$$
$$54 \times (-1) + 64 \times (-1) + 74 \times (-1) +$$
$$84 \times 0 + 94 \times 0 + 104 \times 0 + 114 \times 0 + 124 \times 0$$

Further, the row-wise intermediate data generating section 1 executes the process mentioned at the step S16. That is, the row-wise intermediate data generating section 1 stores the four intermediate data obtained at the processes mentioned above in the intermediate data storing region T (i, j) to (i+Q−1,j) in the memory 3 by once using the SIMD storing command. That is, the row-wise intermediate data generating section 1 stores the intermediate data as follows:

T(0,0)←X(0)
T(1,0)←X(1)
T(2,0)←X(2)
T(3,0)←X(3)

Next, the row-wise intermediate data generating section 1 executes the judgment mentioned at the step S17, after increasing the variable "n" by one. That is, the value of the increased "n" is compared with the value of the (N+1)/2. Since the "n"<the (N+1)/2{n=1 and (N+1)/2=(13+1)/2=7}, the process returns to the step S13. And the value of the variable "m" is increased by one each until the variable "m" becomes 12 at the row-wise intermediate data generating section 1, and the cumulative multiplication and addition operation for the kernel coefficients and the source pixels is executed. And the operation results are stored in the SIMD register X (0) to X (3). That is, the row-wise intermediate data generating section 1 executes the following operation and obtains the intermediate data of Q pieces (four pieces).

$$X(0) = 1\times 0 + 11\times 0 + 21\times 0 + 31\times(-1) + 41\times(-1) +$$
$$51\times(-2) + 61\times(-2) + 71\times(-2) +$$
$$81\times(-1) + 91\times(-1) + 101\times 0 + 111\times 0 + 121\times 0$$
$$X(1) = 2\times 0 + 12\times 0 + 22\times 0 + 32\times(-1) + 42\times(-1) +$$
$$52\times(-2) + 62\times(-2) + 72\times(-2) + 82\times(-1) +$$
$$92\times(-1) + 102\times 0 + 112\times 0 + 122\times 0$$
$$X(2) = 3\times 0 + 13\times 0 + 23\times 0 + 33\times(-1) + 43\times(-1) +$$
$$53\times(-2) + 63\times(-2) + 73\times(-2) + 83\times(-1) +$$
$$93\times(-1) + 103\times 0 + 113\times 0 + 123\times 0$$
$$X(3) = 4\times 0 + 14\times 0 + 24\times 0 + 34\times(-1) + 44\times(-1) +$$
$$54\times(-2) + 64\times(-2) + 74\times(-2) + 84\times(-1) +$$
$$94\times(-1) + 104\times 0 + 114\times 0 + 124\times 0$$

Further, the row-wise intermediate data generating section 1 executes the process mentioned at the step S16 after the step S15. That is, the row-wise intermediate data generating section 1 stores the four intermediate data X (0) to X (3) obtained at the processes mentioned above in the intermediate data storing region T (i, j) to (i+Q−1,j) of the memory 3 by once using the SIMD storing command. The row-wise intermediate data generating section 1 stores the intermediate data as follows:

T(0,1)←X(0)
T(1,1)←X(1)
T(2,1)←X(2)
T(3,1)←X(3)

By executing the same operation mentioned above, the row-wise intermediate data generating section 1 makes the value of the variable "m" increase 1 to 12 by one each, every time when the value of the variable "n" is increased to 2 to 6. And the cumulative multiplication and addition operation for the kernel coefficients and the source pixels is executed. And the operation results are stored in the SIMD register X. And the row-wise intermediate data generating section 1 stores the intermediate data of four pieces in the intermediate data storing region T of the memory 3 by once using the SIMD storing command.

After continuing the processes mentioned above, when the row-wise intermediate data generating section 1 finished the process at the step S17 and went to the process at the step S18, a total of 28 pieces of the intermediate data are stored in the intermediate data storing region T (0, 0) to T (3, 6) of the memory 3.

And the row-wise intermediate data generating section 1 executes the process at the step S18. That is, the value of Q (Q=4) is added to the variable "i" (i=0), and the increased value of i is compared with the value of P (P=256), and when the increased "i" is less than the value of P, the process returns to the step S12. And the processes from the step S12 to the step S18 are repeated. And when the increased "i" became the value of P, the intermediate data generating processes end.

When the intermediate data generating processes by the row-wise intermediate data generating section 1 ended, the intermediate data of 1792 pieces (256×7) are stored in the intermediate data storing region T (0, 0) to T (256, 6) of the memory 3.

After this, the row-wise intermediate data utilizing section 2 executes the processes at the steps S21 and S22 mentioned above. That is, the row-wise intermediate data utilizing section 2 initializes the variables "i" and "n" to "0", and also initializes all elements in the SIMD register X to "0".

And the row-wise intermediate data utilizing section 2 executes the processes at the steps S23 and S24 mentioned above, and stores the intermediate data storing in the intermediate data storing region T of the memory 3 in the SIMD register X. That is, the row-wise intermediate data utilizing section 2 compares the value of "n" with the value of {(N+1)/2} every time when the value "n" is increased by one each until the value "n" becomes from 0 to 12.

When the value "n"≧ the value (N+1) 2, the variable "o" is made the value (N−1−n). And when the value "n"<the value (N+1)/2, the variable "o" is made the value of "n". The intermediate data in the intermediate data storing region T {(i+n, o) to (i+Q−1+n, o)} of the memory 3, shown by these variables "o", are stored in the SIMD register X (0) to X (3). That is, in the SIMD register X (0) to X (3), the following cumulatively added values are stored.

$$X(0) = T(0, 0) + T(1, 1) + T(2, 2) + T(3, 3) +$$
$$T(4, 4) + T(5, 5) + T(6, 6) + T(7, 5) +$$
$$T(8, 4) + T(9, 3) + T(10, 2) + T(11, 1) + T(12, 0)$$
$$X(1) = T(1, 0) + T(2, 1) + T(3, 2) + T(4, 3) +$$
$$T(5, 4) + T(6, 5) + T(7, 6) + T(8, 5) +$$
$$T(9, 4) + T(10, 3) + T(11, 2) + T(12, 1) + T(13, 0)$$
$$X(2) = T(2, 0) + T(3, 1) + T(4, 2) + T(5, 3) +$$
$$T(6, 4) + T(7, 5) + T(8, 6) + T(9, 5) +$$
$$T(10, 4) + T(11, 3) + T(12, 2) + T(13, 1) + T(14, 0)$$
$$X(3) = T(3, 0) + T(4, 1) + T(5, 2) + T(6, 3) +$$
$$T(7, 4) + T(8, 5) + T(9, 6) + T(10, 5) +$$
$$T(11, 4) + T(12, 3) + T(13, 2) + T(14, 1) + T(15, 0)$$

The cumulatively added values obtained by the processes mentioned above become operation result pixels at the positions "n" is from 0 to 3 of the 13×13 Mexican hat shaped image filter.

Further, the row-wise intermediate data utilizing section 2 executes the process at the step S25, and stores the operation result pixels storing in the SIMD register X in the operation result pixel storing region D (i, j) to D (i+Q−1, j) of the memory 3. That is, the row-wise intermediate data utilizing section 2 stores the operation result pixels in the operation result pixel storing region D (0, 0) to D (3, 0) of the memory 3 as follows:

D(0,0)←X(0)
D(1,0)←X(1)
D(2,0)←X(2)
D(3,0)←X(3)

The row-wise intermediate data utilizing section 2 repeats the processes from the step S22 to S25 P/Q times (64=256/4), by increasing the variable "i" adding the value Q until the increased "i" becomes the value P. Consequently, the operation result pixels of one row are stored in the operation result pixel storing region D (0,0) to (256,0) of the memory 3. As the processes mentioned above, the operation result pixels of one row of the source image S are obtained.

As mentioned above, in the symmetric type image filter processing apparatus at the embodiment of the present invention, the number of the necessary SIMD command steps for obtaining the operation result pixels of one row is {2×M×(N+1)/2+N}×P/Q steps. At the conventional technology, the number of the necessary SIMD command steps is 2×N×M×P/Q. Therefore, the difference between the present invention and the conventional technology is {N×M−(N+M)}×P/Q steps, and the number of steps is reduced largely at the present invention.

Consequently, at the case of the symmetric type image filter processing apparatus in which the M is equal to the N, the larger the kernel size (N=M>3) is, the larger the difference becomes. FIG. 7 is a diagram showing the reduced rate of the SIMD command steps at the symmetric type image filter processing apparatus at the embodiment of the present invention. As shown in FIG. 7, compared with the conventional technology, about 50% of the SIMD command steps can be reduced at the largest at the embodiment of the present invention. That is, when the filter processing is executed by using a symmetric type image filter processing apparatus in which the kernel size is large (the N and M are large), the high speed processing can be realized by the present invention.

A part or all of the processes at the row-wise intermediate data generating section 1 and the row-wise intermediate data utilizing section 2 can be executed by a program controlled by a CPU or a MPU.

As mentioned above, according to the embodiment of the present invention, the necessary SIMD command steps for obtaining the operation result pixels of one row at the symmetric type image filter processing apparatus can be reduced largely. Therefore, the high speed filtering for the image data can be realized.

While the present invention has been described with reference to the particular illustrative embodiment, it is not to be restricted by that embodiment but only by the appended claims. It is to be appreciated that those skilled in the art can change or modify the embodiment without departing from the scope and spirit of the present invention.

What is claimed is:

1. A symmetric type image filter processing apparatus, which processes image data by a symmetric type image filter composed of N×M kernel coefficients, N and M are odd numbers being 3 or more integers, comprising:
    an operating means that multiplies kernel coefficients of a column on the left or on the right of a center column by column elements of image data corresponding to said column, and cumulatively adds the multiplied results;
    a memorizing means that memorizes the sum of the multiplied results generated at said operating means as intermediate data; and
    a pixel value calculating means that calculates filtered pixel values of said image data based on said intermediate data memorized in said memorizing means, wherein
    the operating means does not utilize all the N×M kernel coefficients for said multiplication.

2. A symmetric type image filter processing apparatus in accordance with claim 1, wherein:
    said operating means calculates intermediate data in one row of said image data, and said pixel value calculating means reads out said intermediate data corresponding to the position of each pixel of said image data, and calculates said filtered pixel value by cumulatively adding said read out intermediate data.

3. A symmetric type image filter processing apparatus in accordance with claim 1 or 2, wherein:
    said operating means and said pixel value calculating means execute the operation of said multiplication and said cumulative addition by using SIMD commands.

4. A symmetric type image filter processing apparatus in accordance with claim 1, wherein:
    the number of pixels in one row of said image data is P (P is a positive integer), and said operating means multiplies each kernel coefficient of M pieces in each column of {(N+1)/2} columns at said right or left of said center column by each pixel of M pieces in the column direction of said image data and cumulatively adds the multiplied results, by using SIMD commands that are capable of processing data of sequential Q pieces simultaneously, (Q>1 and Q is a positive integer satisfying the condition P>Q), and executes this multiplying and cumulatively adding operation P/Q times, and generates said intermediate data in one row of said image data.

5. A computer-readable storage medium storing a program for making a computer work to execute filter processing to image data by using a symmetric type image filter composed of N×M kernel coefficients (N and M are odd numbers being 3 or more integers), said filter processing comprising:
    an operating step that multiplies kernel coefficients of a column to the left or to the right of a center column by column elements of image data corresponding to said column and cumulatively adds the multiplied results;
    a memorizing step that memorizes the sum of the multiplied results generated at said operating step as intermediate data; and
    a pixel value calculating step that calculates filtered pixel values of said image data based on said intermediate data memorized at said memorizing step, wherein in the operating step, all the N×M kernel coefficients are not utilized for said multiplication.

6. A computer-readable medium storing a program for making a computer work to execute filter processing to image data in accordance with claim 5, wherein:
    said operating step calculates intermediate data in one row of said image data, and
    said pixel value calculating step reads out said intermediate data corresponding to the position of each pixel of said image data, and calculates said filtered pixel value by cumulatively adding said read out intermediate data.

7. A computer-readable medium for storing a program for making a computer work to execute filter processing to image data in accordance with claim 5 or 6, wherein:

said operating step and said pixel value calculating step execute the operation of said multiplication and said cumulative addition by using SIMD commands.

8. A computer-readable medium for storing a program for making a computer work to execute filter processing to image data in accordance with claim 5, wherein:

the number of pixels in one row of said image data is P (P is a positive integer), and said operating step multiplies each kernel coefficient of M pieces in each column of {(N +1)/2} columns at said right or left of said center column by each pixel of M pieces in the column direction of said image data and cumulatively adds the multiplied results, by using SIMD commands that are capable of processing data of sequential Q pieces simultaneously, (Q>1 and Q is a positive integer satisfying the condition P>Q), and executes this multiplying and cumulatively adding operation P/Q times, and generates said intermediate data in one row of said image data.

9. A method for processing image data by a symmetric type image filter composed of N×M kernel coefficients (N and M are odd numbers being 3 or more integers), the method comprising:

multiplying kernel coefficients of a column on the left or on the right of a center column by column elements of image data corresponding to said column;

generating intermediate data based on the multiplying;

memorizing said intermediate data; and calculating filtered pixel values of said image data based on said intermediate data, wherein the multiplying does not utilize all the N×M kernel coefficients.

10. A method for processing image data in accordance with claim 9, wherein:

said intermediate data is calculated in one row of said image data, and said filtered pixel values are calculated by reading out said intermediate data corresponding to the position of each pixel of said image data, and by cumulatively adding said read out intermediate data.

11. A method for processing image data in accordance with claim 9 or 10, wherein:

said multiplying operation and said cumulatively adding operation and said pixel value calculating operation are executed by using SIMD commands.

12. A method for processing image data in accordance with claim 9, wherein:

the number of pixels in one row of said image data is P (P is a positive integer), and said intermediate data in one row of said image data are generated by P/Q times of said multiplying and cumulatively adding operation that multiplies each kernel coefficient of M pieces in each column of {(N+1)/2} columns at said right or left of said center column by each pixel of M pieces in the column direction of said image data and cumulatively adds the multiplied results, by using SIMD commands that are capable of processing data of sequential Q pieces simultaneously, (Q>1 and Q is a positive integer satisfying the condition P>Q).

13. The apparatus of claim 1, wherein the pixel value calculating means stores the calculated pixel values of said image data in an operation result pixel storing region.

14. The computer-readable storage medium of claim 5, wherein the filtering processing further comprising a step of storing the pixel value calculating means stores the calculated pixel values of said image data in an operation result pixel storing region.

15. The method of claim 9, further comprising storing the pixel value calculating means stores the calculated pixel values of said image data in an operation result pixel storing region.

* * * * *